United States Patent
Zhang et al.

(10) Patent No.: US 11,770,598 B1
(45) Date of Patent: Sep. 26, 2023

(54) SENSOR ASSEMBLY FOR ACQUIRING IMAGES

(71) Applicant: AMAZON TECHNOLOGIES, INC., Seattle, WA (US)

(72) Inventors: Rui Zhang, Sammamish, WA (US); Markus Stefan Duelli, Seattle, WA (US); Umer Shahid, Sammamish, WA (US); Baomin Wang, Seattle, WA (US); Prafulla Masalkar, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/706,464

(22) Filed: Dec. 6, 2019

(51) Int. Cl.
| | |
|---|---|
| *H04N 5/225* | (2006.01) |
| *F21V 14/06* | (2006.01) |
| *G03B 15/06* | (2021.01) |
| *G02B 27/28* | (2006.01) |
| *G02B 5/30* | (2006.01) |
| *G03B 15/05* | (2021.01) |
| *H04N 23/56* | (2023.01) |
| *G06V 40/10* | (2022.01) |

(52) U.S. Cl.
CPC ............. *H04N 23/56* (2023.01); *F21V 14/06* (2013.01); *G02B 5/3033* (2013.01); *G02B 27/281* (2013.01); *G03B 15/05* (2013.01); *G03B 15/06* (2013.01); *G06V 40/107* (2022.01)

(58) Field of Classification Search
None
See application file for complete search history.

(56) References Cited

U.S. PATENT DOCUMENTS

| | | | | |
|---|---|---|---|---|
| 5,751,836 | A * | 5/1998 | Wildes et al. | G06K 9/00597 382/117 |
| 2001/0041073 | A1* | 11/2001 | Sorek et al. | H04N 5/23212 396/431 |
| 2009/0080709 | A1* | 3/2009 | Rowe et al. | G06K 9/4652 382/115 |
| 2019/0294031 | A1* | 9/2019 | Ley et al. | H04N 19/186 |
| 2020/0134773 | A1* | 4/2020 | Pinter et al. | G06T 7/0006 |

* cited by examiner

*Primary Examiner* — James M Hannett
(74) *Attorney, Agent, or Firm* — Lindauer Law, PLLC

(57) ABSTRACT

A device for providing even illumination to a user's hand or other object to acquire images of the object for biometric identification of a user, includes a camera, a first light module positioned on a first side of the camera, and a second light module positioned on a second side of the camera. The camera is positioned closer to the second light module. The second light module emits light with a lesser intensity than the first light module. Light bending films positioned adjacent to the light modules redirect emitted light toward opposite edges of the field of view of the camera. Diffusers in the path of the emitted light diffuse portions of the emitted light along the edges of the field of view. Polarizers positioned in the path of the emitted light polarize the emitted light to facilitate visualization of particular features of the hand or other object.

21 Claims, 8 Drawing Sheets

SENSOR ASSEMBLY FOR ACQUIRING IMAGES

BACKGROUND

Various types of facilities may need to identify users at the facility before granting entry to the user, allowing the user to purchase an item, allowing the user to access particular items, services, or areas, and so forth. One possible method for identifying a user may include acquiring an image of the user's hand or another object. However, illuminating objects having an irregular shape may result in low quality images due to the presence of over-illuminated and under-illuminated regions of the object.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
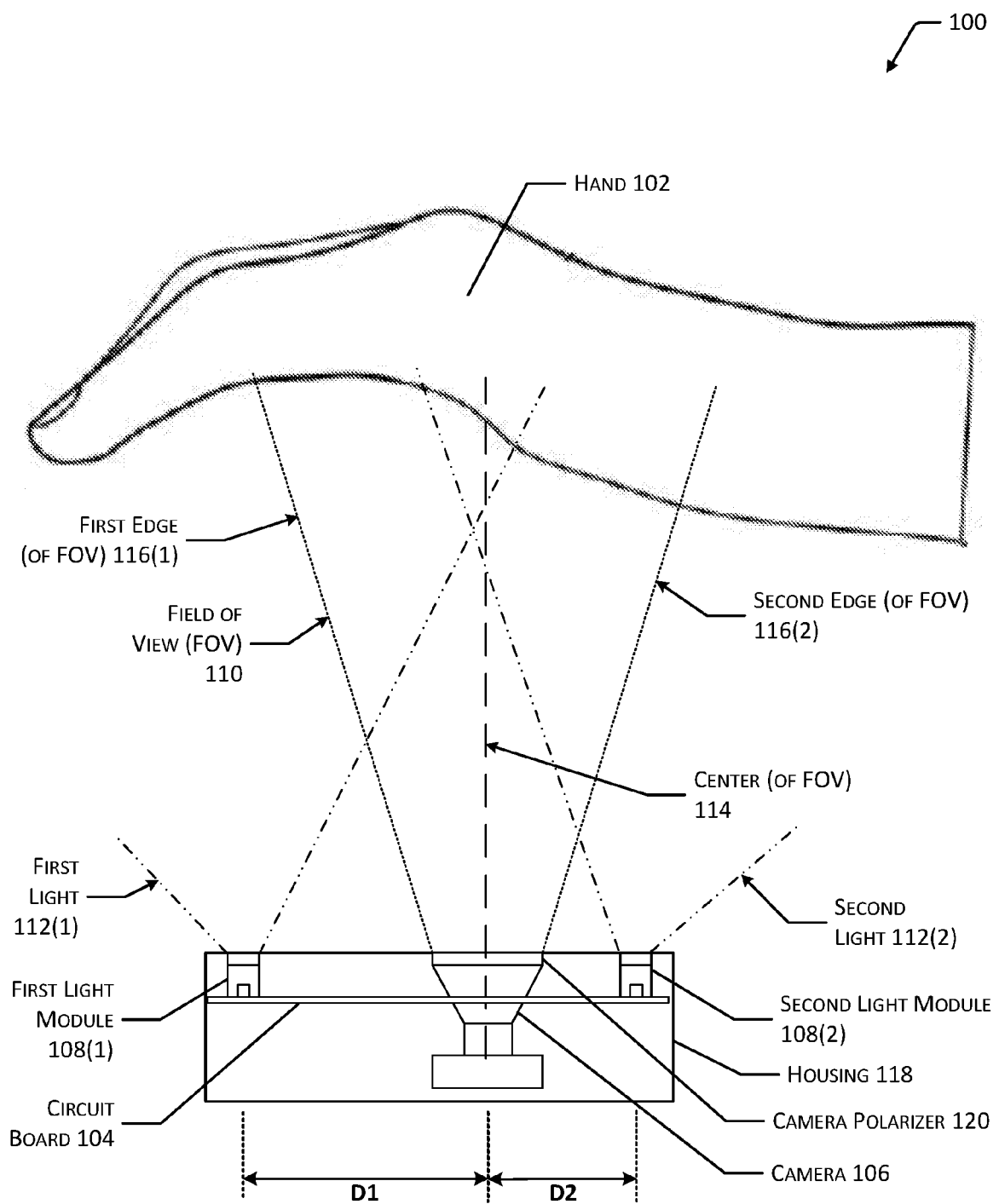
FIG. 1 depicts a diagrammatic side view of a sensor assembly usable to acquire images of a hand of the user, or other object.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Identification of a user may be accomplished rapidly and accurately through use of biometric input. Determining a user's identity may serve a variety of purposes. For example, biometric input may be used to access a facility by providing such input at a point of entry. As another example, biometric input may be used to facilitate payment for goods or services, such as by associating the identity of a user with a payment method, then using the payment method to complete a purchase transaction in response to identifying the user. As yet another example, biometric input may be used to sign an electronic record, such as to indicate acceptance of a delivery. Use of biometric input may provide greater security than traditional systems. For example, systems that require a user to present a card or other type of token are subject to the card or token becoming lost or entering the possession of an unauthorized individual. However, traditional systems for acquisition of biometric input may be subject to slow data acquisition, limited resolution, increased wear, and so forth. For example, traditional palm-based identification systems require physical contact between the user's hand and a device, which may be considered unsanitary or uncomfortable to some users, and in some cases may be difficult for some users to accomplish.

Acquisition of images, such as an image of a user's palm, may also be hindered by the irregular shape of the palm. For example, when attempting to illuminate the palm using infrared light emitting diodes (LEDs) or other types of light sources, the quality of the images may be reduced by the presence of glare or hotspots, and darkened areas, such as the edges of the field of view. Continuing the example, protruding regions of the palm, such as the thenar eminence beneath a user's thumb, may appear significantly brighter than portions of the palm closer to the user's fingers, which may appear significantly darker than other portions of the image. The presence of brighter and darker regions may hinder the ability to acquire an image having visible features suitable to identify the user.

Described in this disclosure are systems for illuminating an object, such as the palm of a user, for acquisition of an image suitable to identify the user. The systems described herein may also be used for illumination of other objects for other purposes. A camera may be mounted to or otherwise positioned relative to a circuit board or other type of structure within a housing, such as by positioning the camera within an orifice of the circuit board. The camera may include an image sensor, polarizer, lens, and so forth. Light modules may be mounted to the circuit board at locations suitable to illuminate objects within the field of view of the camera. Each light module may include one or multiple light sources. In some implementations, the light sources may include infrared LEDs that radiate light having a wavelength ranging from 740 nanometers (nm) to 1000 nm. In one implementation, the light sources may emit light having a wavelength of 850 nm. In other implementations, the light sources may include one or more of quantum dots, electroluminescent devices, fluorescent devices, lamps, lasers, and so forth.

A first light module may be positioned on a first side of the camera, while a second light module is positioned on a second side of the camera opposite the first side. The second light module may be configured to emit light having a lesser intensity than light emitted by the first light module. For example, the second light module may include a smaller number of light sources than the first light module. As another example, the second light module may be operated using a smaller amount of power than the first light module to cause the light emitted by the second light module to have a lesser intensity. As yet another example, the second light module may include different types of light sources than the first light module, such as types of light sources that emit light having a lesser intensity, light having a different wavelength, and so forth. As still another example, the second light module may include a film, cover, or other component that filters at least a portion of emitted light, that is positioned over the second light module to decrease the intensity of light that passes through the component.

In some implementations, the camera may be positioned closer to the second light module than to the first light module. For example, the camera may be positioned 25 millimeters (mm) from the second light module and 45 mm from the first light module. In some cases, the circuit board, camera, and light modules may be part of a small form-factor device to facilitate integration with existing or new systems. For example, the circuit board that includes the camera and light assemblies may have a width of approximately 50 mm and a length of approximately 70 mm. An image of an object may be acquired without requiring contact between the hand and an input device. For example, if a hand or other object is detected within the field of view of the camera, the light modules and camera may be operated to illuminate the hand and acquire one or more images.

In some implementations, the light modules may include one or more films or other types of modifiers that redirect emitted light, such as by diffracting or refracting light away from the center of the field of view of the camera and toward one or more edges of the field of view. Over-illumination of the center of the field of view may cause protruding elements of a hand, such as the thenar eminence, to be affected by a glare or hotspot, while causing elements near the edge of the field of view, such as portions of the palm near the fingers, to appear darkened. For example, a first light bending film (e.g., a direction turning film) may be positioned in the path of light emitted by the light sources of the first light module, and may redirect a portion of the emitted light away from the center of the field of view and toward a first edge of the field of view. A second light bending film may be positioned in the path of the light emitted by light sources of the second light module and may redirect emitted light away from the center of the field of view and toward a second edge opposite the first edge. In some implementations, the angle of the redirected light may range from 10 degrees to 40 degrees relative to an axis extending perpendicularly outward from the light modules. In one implementation, the angle of the redirected light may be 30 degrees. In another implementation, the angle of the redirected light may be 20 degrees.

In some implementations, the light modules may also each include a diffuser positioned in the path of the light emitted by the light sources. Each diffuser may spread the light emitted by the light sources to increase the area illuminated by the light. For example, a diffuser may redirect a portion of emitted light from a first portion of the field of view to a second portion. In some implementations, a diffuser may include a rectangular diffuser having a long axis perpendicular to a line extending between the camera and the light module. In such a case, the diffusers may primarily direct light along the edge of the field of view that extends parallel to the long axis of the diffuser. In other implementations, other types of diffusers having other shapes, such as square diffusers, may be used. In some implementations, the diffusers may include a micro lens array (MLA) that diffuses light while maintaining the polarization of light that passes through the diffuser.

In some implementations, the light modules may also each include a polarizer positioned in the path of light from the light sources. For example, a polarizer may include a dichroic material or structure that passes light with a linear polarization. Continuing the example, polarizers may include one or more of aligned polyvinylene chains, silver nanoparticles embedded in a transparent substrate such as glass, wire-grid polarizers, beam-splitting polarizers, quarter-wave plates, liquid crystals, photoelastic modulators, and so forth. The polarizers may cause the light emitted by the light modules to illuminate an object in the field of view of the camera with a first polarization. For example, the first polarization may be a polarization suitable for visualization of surface features of a hand or other object, such as lines and creases in a user's palm. In other implementations, use of a polarizer may be omitted, and light from the light modules may illuminate a user's hand or other object without providing the light with a polarization. In some implementations, one or more additional light modules may be mounted in the circuit board and may include a polarizer having a different polarization than the polarization associated with the first and second light modules. For example, an additional light module that emits light having a different polarization may be used to visualize internal structures of an object, such as veins, bones, soft tissue, or other structures beneath a user's epidermis. In some cases, different light modules may be actuated at different times to acquire multiple images of an object. For example, a first image or set of images may be acquired during illumination of an object by the first and second light modules, while a second image or set of images may be acquired during illumination of the object by the additional light module(s). The first set of images may depict external characteristics of a user's palm or an object, while the second set of images may depict internal characteristics of the object. In some implementations, a polarizer associated with the camera may be used in place of or in addition to polarizers associated with the light modules. For example, the polarizer associated with the camera may have the same polarization as the polarizers associated with the first and second light modules.

Implementations within the present disclosure may illuminate objects within the field of view of a camera in a manner that provides an object in the field of view with generally even illumination when compared to existing techniques, thereby improving the quality and suitability of images that are generated. Additionally, implementations described herein may be incorporated into a small form-factor that may not require contact with a user's hand or other object to acquire an image of the user's hand. For example, use of the implementations described herein may enable a small sensor assembly to acquire an image of a larger object, such as a hand. Continuing the example, a sensor assembly may include a camera, one or more light modules, and circuitry for operating the camera and light modules within a single housing.

In some implementations, a sensor assembly may be incorporated into a device (e.g., within a housing of the device) that may be used to acquire images of a user's hand or other object, such as for purposes of acquiring biometric input to provide access to an area, complete a purchase transaction, and so forth. The sensor assembly may include a camera, one or more light modules, and so forth. When a user's hand or other object passes within the field of view of the camera, the light modules of the sensor assembly may be operated to illuminate the hand or other object in the field of view, while the camera is used to acquire one or more images of the object. Such a device may also include a display, touch sensor, card reader, or other types of input and output devices within the housing of the device or external to the housing.

FIG. 1 depicts a diagrammatic side view of a sensor assembly 100 that may be used as an input device to acquire images of a hand 102 of a user or other object. The sensor assembly 100 includes a circuit board 104 or other structure, such as a frame or chassis. The sensor assembly 100 may include a camera 106 and one or more light modules 108. When an object, such as a user's hand 102, enters the field of view (FOV) 110 of the camera 106, one or more of the light modules 108 may be operated to illuminate the object within the field of view 110, and the camera 106 may be operated to acquire one or more images of the object. For example, FIG. 1 depicts the first light module 108(1) emitting first light 112(1) toward the field of view 110 and the second light module 108(2) emitting second light 112(2) toward the field of view 110. The first light 112(1) and second light 112(2) may illuminate the hand 102 or other object to facilitate acquisition of one or more images of the object by the camera 106. In some implementations, the sensor assembly 100 may include a proximity sensor or another type of sensor that may detect the presence of an object within or proximate to the field of view 110. In response to data from the proximity sensor or other type of sensor, the light modules 108 and the camera 106 may be operated. The circuit board 104 or another component of the sensor assembly 100 in electrical communication with the circuit board 104 may include circuitry or other electronics for operating the light modules 108 and camera 106. The circuit board 104, camera 106, light modules 108, and in some implementations, other components of the sensor assembly 100 may be contained within a housing 118. For example, implementations described herein may include a small form-factor device contained within a single housing 118 that may be used to acquire images of a user's hand 102 or other object. In some implementations, the sensor assembly 100 may include one or more processors, memory, or computer-executable instructions to operate the light modules 108 and camera 106. In other implementations, a computing device separate from the sensor assembly 100 may be used to cause operation of the light modules 108 and camera 106.

The camera 106 may be mounted to the circuit board 104, may extend through an orifice in the circuit board 104, or may be positioned relative to the circuit board 104 in other ways. The camera 106 may include an image sensor, camera body, lens, and in some implementations, a camera polarizer 120. For example, light from the field of view 110 may enter the camera 106 through an aperture that includes the lens. Light that reaches the image sensor may be used to generate image data representative of objects in the field of view 110. In cases where the camera 106 includes a camera polarizer 120, the light that reaches the image sensor may be limited to light having a particular polarization. In some cases, the camera 106 may be configured to acquire images of objects illuminated by infrared light. For example, the light modules 108 may emit infrared light, while the image sensor of the camera 106 may include charge coupled devices, complementary metal oxide semiconductor devices, microbolometers, or other components capable of detecting infrared light emitted by the light modules 108.

The light modules 108 may include one or more light sources, such as LEDs, quantum dots, electroluminescent devices, fluorescent devices, lamps, lasers, and so forth. The first light module 108(1) may be positioned on a first side of the camera 106, while a second light module 108(2) is positioned on a second side of the camera 106 opposite the first side. The second light module 108(2) may be configured to emit light having an intensity less than the intensity of light emitted by the first light module 108(1). For example, the first light module 108(1) may include a greater number of light sources than the second light module 108(2), such that the amount of light emitted by the first light module 108(1) may exceed that emitted by the second light module 108(2). In other implementations, the first light module 108(1) and second light module 108(2) may each include an equal number of light sources, and the second light module 108(2) may be actuated using less power than the first light module 108(1), causing the second light module 108(2) to emit light with a lower intensity than the first light module 108(1). In still other implementations, the second light module 108(2) may have a different type of light source(s) than the first light module 108(1), that emit light at a lower intensity, or may include a filter or other type of modifier placed over one or more of the light sources to limit the intensity of the light that is emitted by the second light module 108(2). Configuring the second light module 108(2) to emit less light or light having a lower intensity than the first light module 108(1) may result in less light illuminating protruding features of a user's hand 102, such as the thenar eminence beneath a user's thumb, while enabling a larger amount of light, relative to the amount illuminating the protruding features, to illuminate portions of the hand 102 near the fingers. Additionally, in some implementations, the camera 106 may be positioned closer to the second light module 108(2) than to the first light module 108(1), which may reduce the likelihood of over-illumination of portions of the hand 102 near the base of the palm and the appearance of darker regions near portions of the hand 102 that are close to the fingers. For example, FIG. 1 depicts the first light module 108(1) positioned a first distance D1 from the camera 106. The second light module 108(2) is positioned a second distance D2 from the camera 106 that is less than the first distance D1. In some implementations, the first distance D1 may be approximately double the second distance D2. For example, in one implementation, the second distance D2 may be 25 mm and the first distance may be 45 mm. In other implementations, the first distance D1 and second distance D2 may be approximately equal.

As described previously, the light modules 108 may include light bending films, diffusers, and polarizers that redirect and polarize the light emitted by the light modules 108. For example, as shown in FIG. 1, the first light module 108(1) may emit first light 112(1) toward a portion of the field of view 110 that corresponds to the regions of the hand 102 proximate to the fingers. The second light module 108(2) may emit second light 112(2) toward a portion of the field of view 110 that corresponds to the regions of the hand 102 proximate to the base of the palm. The first light module 108(1) may include a first light bending film that redirects at least a portion of the first light 112(1) away from the center 114 of the field of view 110 and toward a first edge 116(1) thereof. The first edge 116(1) of the field of view 110 may be a side of the field of view 110 that is closest to the first light module 108(1). The second light module 108(2) may include a second light bending film that redirects at least a portion of the second light 112(2) away from the center 114 of the field of view 110 and toward a second edge 116(2) thereof, opposite the first edge 116(1). The second edge 116(2) may be the side of the field of view 110 that is closest to the second light module 108(2). For example, FIG. 1 depicts the first light 112(1) and second light 112(2) being directed in an angle that is inclined approximately 20 degrees away from the center 114 of the field of view 110. Directing light away from the center 114 and toward the edges 116 of the field of view 110 may reduce the amount of light that illuminates protruding portions of the hand 102, such as the thenar eminence, thus reducing the likelihood of glare or hotspots, while increasing the amount of light that illuminates portions of the hand 102 closer to the edges 116 of the field of view 110, which may otherwise appear darkened.

Figure 2:
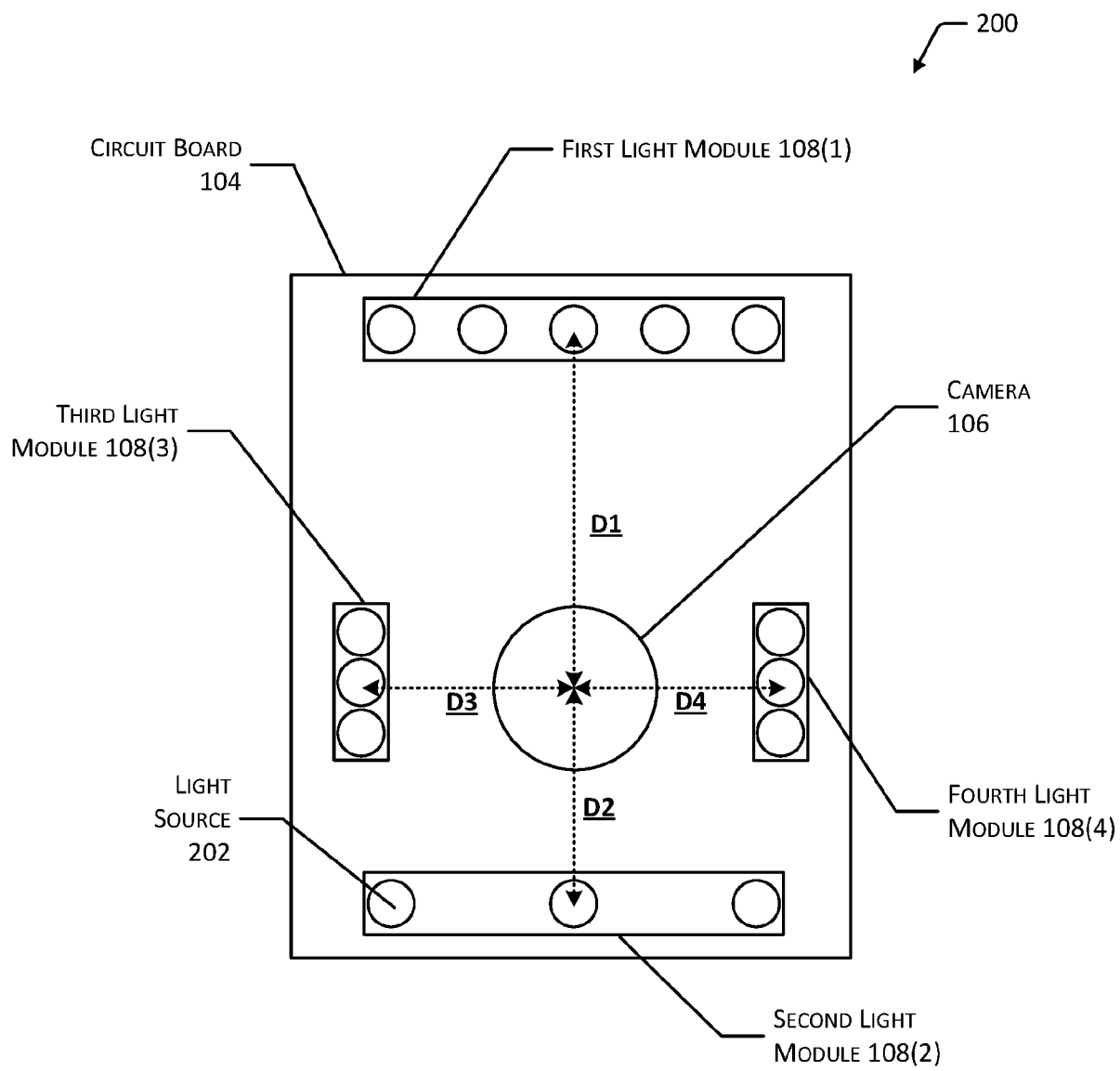
FIG. 2 depicts a diagrammatic top view of the circuit board shown in FIG. 1.

FIG. 2 depicts a diagrammatic top view 200 of the circuit board 104 shown in FIG. 1. As described with regard to FIG. 1, a camera 106 and one or more light modules 108 may be positioned in association with the circuit board 104. The light modules 108 may be used to illuminate a hand 102 or other object within the field of view 110 of the camera 106 to enable one or more images of the object to be acquired. As described with regard to FIG. 1, in some implementations, the second light module 108(2) may be configured to emit light having an intensity less than the light emitted by the first light module 108(1). For example, FIG. 2 depicts the second light module 108(2) including a smaller number of light sources 202 (e.g., three light sources 202) than the first light module 108(1) (e.g., which is shown including five light sources 202). As shown in FIG. 2, a portion of the circuit board 104 defined by the light modules 108 may have an approximately rectangular shape, and the location of the camera 106 may be approximately centered with regard to the shorter axis of the rectangular shape, and off-center with regard to the longer axis of the rectangular shape. For example, as described with regard to FIG. 1, a first distance D1 between the camera 106 and first light module 108(1) may be greater than a second distance D2 between the camera 106 and the second light module 108(2).

FIG. 2 also depicts a third light module 108(3) on a third side of the camera 106 and a fourth light module 108(4) on a fourth side of the camera 106 opposite the third side. The third light module 108(3) and fourth light module 108(4) are each depicted having an equal number of light sources 202 (e.g., three light sources 202), and are each depicted being approximately the same distance from the camera 106. However, in other implementations, the third light module 108(3) and fourth light module 108(4) may have different quantities of light sources 202 or may be configured to emit light having different intensities, and may be positioned at different distances relative to the camera 106. For example, FIG. 2 depicts the third light module 108(3) positioned at a third distance D3 from the camera 106, and the fourth light module 108(4) positioned at a fourth distance D4 from the camera 106. In some implementations, the second distance D2, third distance D3, and fourth distance D4 may be approximately equal. In one implementation, the second distance D2, third distance D3, and fourth distance D4 may each be 25 mm, while the first distance D1 is 45 mm.

In some implementations, different light modules 108 may be configured to emit light having different polarizations. For example, the first light module 108(1) and second light module 108(2) may include polarizers that provide emitted light with a first polarization suitable to visualize surface features of a hand or other object, while the third light module 108(3) and fourth light module 108(4) include polarizers that provide emitted light with a second polarization suitable to visualize features beneath a user's epidermis, such as veins. Sets of light modules 108 having the same polarization may be operated at different times from other light modules 108 to enable acquisition of images of both surface and internal structures of a hand 102 or other object. For example, at a first time, the first light module 108(1) and second light module 108(2) may be operated to illuminate a hand 102 with light having a first polarization while the camera 106 is used to acquire one or more images of surface features of the hand 102. At a second time, the third light module 108(3) and fourth light module 108(4) may be operated to illuminate the hand 102 with light having a second polarization while the camera 106 is used to acquire one or more images of internal features of the hand 102.

Figure 3:
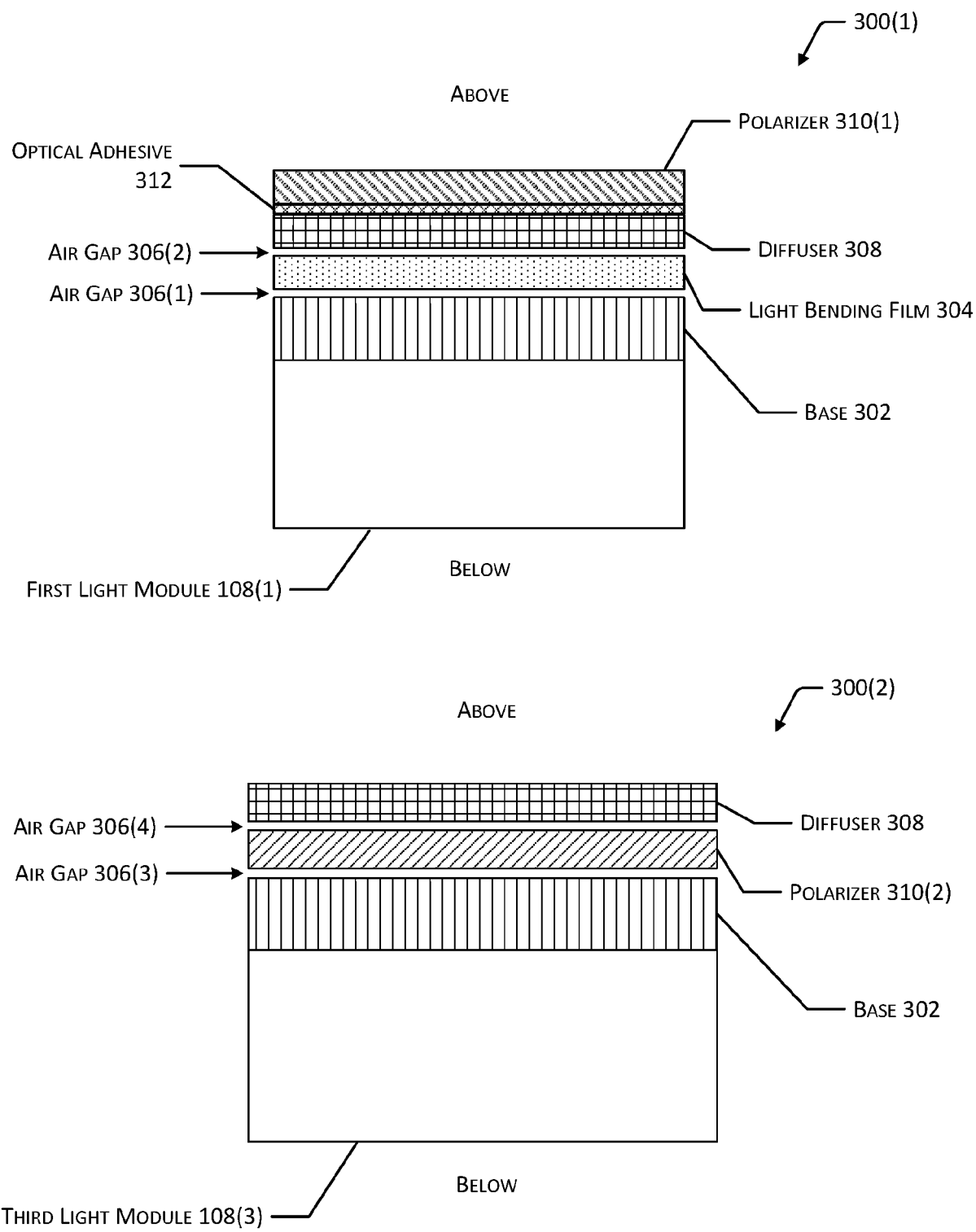
FIG. 3 depicts diagrammatic side views of the first light module and third light module of FIG. 2, illustrating implementations of an arrangement of modifiers that may be used to affect the light emitted by the first light module and third light module.

FIG. 3 depicts diagrammatic side views 300 of the first light module 108(1) and third light module 108(3) of FIG. 2, illustrating implementations of an arrangement of modifiers that may be used to affect the light emitted by the first light module 108(1) and third light module 108(3). In some implementations, the arrangement of components in the second light module 108(2) may be identical to the arrangement of components in the first light module 108(1). Additionally, in some implementations, the arrangement of components in the fourth light module 108(4) may be identical to the arrangement of components in the third light module 108(3).

In a first diagrammatic view 300(1), FIG. 3 depicts the first light module 108(1) having a base 302 positioned over the light sources 202. The base 302 may include any manner of material suitable for supporting other components that is sufficiently transparent or translucent to allow passage of light from the first light module 108(1). For example, the first light module 108(1) may include a glass or plastic cover, frame, holder, or other similar structure that may function as a base 302 upon which other components may be placed.

A light bending film 304 may be positioned adjacent to the base 302 of the first light module 108(1). The light bending film 304 may include any manner of direction turning film or other material that may redirect incident light from a first angle to a second angle that differs from the first angle. For example, the light bending film 304 may receive incident light that is emitted in a direction generally perpendicular to the surface of the first light module 108(1) or base 302 and redirect the light outward relative to a center 114 of the field of view 110 of the camera 106, toward an edge 116 of the field of view 110. In some implementations, the light bending film 304 may redirect the light at an angle of 20 degrees relative to a line extending outward from and perpendicular to the surface of the light module 108(1) upon which the light bending film 304 is placed. In other implementations, the light bending film 304 may redirect the light at an angle of 30 degrees.

The light bending film 304 may be secured adjacent to the base 302 such that an air gap 306(1) is maintained between the light bending film 304 and the base 302, such as through use of one or more spacers positioned between the light bending film 304 and the base 302. Maintaining an air gap 306(1) of a sufficient width, such as a width ranging from one to ten microns, may enable surface features of the light bending film 304 to function to redirect light. For example, if the light bending film 304 were abutting the base 302 or other adjacent components, or if the surface features of the light bending film 304 were filled with an adhesive, the functionality of the light bending film 304 may be hindered.

A diffuser 308 may be positioned adjacent to the light bending film 304. In some implementations, the diffuser 308 may include a rectangular diffuser having a long axis parallel to the long axis of the first light module 108(1), and parallel to the edge 116 of the field of view 110 that is closest to the first light module 108(1) (e.g., perpendicular to a line extending from the camera 106 to the first light module 108 (1)). For example, a rectangular diffuser 308 may function to redirect a greater portion of the light emitted by the first light module 108(1) along an edge 116 of the field of view 110 that is parallel to the long axis, rather than toward the center 114 of the field of view 110. In other implementations, the diffuser 308 may redirect a portion of the light emitted by the first light module 108(1) from a first portion of the field of view 110 to a second portion of the field of view 110, independent of the location of the center 114 or edges 116 of the field of view relative to the first light module 108(1). For example, a square diffuser 308, or a diffuser 308 having another shape that lacks a long axis, may increase the size of an area illuminated by the emitted light independent of the location of the center 114 or edges 116 of the field of view relative to the first light module 108(1).

The diffuser 308 may be secured adjacent to the light bending film 304 in a manner that maintains an air gap 306(2) between the diffuser 308 and the light bending film 304. For example, one or more spacers may be positioned between the diffuser 308 and the light bending film 304. Maintaining an air gap 306(2) of a sufficient width, such as a width ranging from one to ten microns, between the diffuser 308 and the light bending film 304 may enable surface features of incident surface of the diffuser 308 to function to redirect light. For example, if the diffuser 308 were directly adjacent to the light bending film 304 or if the surface features of the diffuser 308 were filled with an adhesive, the functionality of the diffuser 308 may be hindered.

A polarizer 310(1) may be positioned adjacent to the diffuser 308 of the first light module 108(1). In some implementations, the polarizer 310(1) may be secured adjacent to the diffuser 308 using one or more optical adhesives 312. The polarizer 310(1) may provide light emitted by the first light module 108(1) with a first polarization suitable for visualizing surface features of a hand 102 or other illuminated object. In some implementations, the polarizer 310(1) may include a dichroic material or structure that passes light with a linear polarization. For example, the polarizer 310(1) may include aligned polyvinylene chains, silver nanoparticles embedded in a transparent substrate such as glass, and so forth. In other implementations, other polarization devices may be used, including but not limited to wire-grid polarizers, beam-splitting polarizers, quarter-wave plates, liquid crystals, photoelastic modulators, and so forth. For example, a photoelastic modulator may include a device that is controlled by an electrical signal which drives a piezoelectric transducer to vibrate a half wave resonant bar, such as fused silica. By changing the frequency of the signal, the frequency of a vibration produced by the transducer may be changed, and the polarization light passing through the resonant bar may be selected. In other implementations, the polarizer 310 may be omitted, and light from the first light module 108(1) may be used to illuminate an object without applying a polarization to the light.

While FIG. 3 depicts the first light module 108(1) including a light bending film 304 positioned beneath a diffuser 308 that is positioned beneath a polarizer 310(1), in other implementations, the components of the first light module 108(1) may include other arrangements. For example, the polarizer 310(1) may be positioned beneath one or more of the light bending film 304 or the diffuser 308, and the light bending film 304 or diffuser 308 may include a material that maintains the polarization of the light passing therethrough. For example, the diffuser 308 may include a micro lens array (MLA) that diffuses light while maintaining the polarization of light passing through. Additionally, as described previously, the second light module 108(2) may include an identical arrangement of components to those described with regard to the first light module 108(1). However, in other implementations, the first light module 108(1) and second light module 108(2) may include different arrangements of components. For example, the first light module 108(1) and second light module 108(2) may include light bending films 304 that provide emitted light with different angles relative to the field of view 110, diffusers 308 that redirect light differently based on the position of the light modules 108 relative to the camera 106, and so forth. The first light module 108(1) and second light module 108(2) may each include a polarizer 310 that provides the emitted light with a polarization suitable for visualization of surface features of a hand 102 or other object, such that the first light module 108(1) and second light module 108(2) may be operated simultaneously to illuminate an object within the field of view 110.

Additionally, while FIG. 3 depicts an arrangement of components that may be associated with the entire first light module 108(1), in other implementations, particular light sources 202 or sets of light sources 202 within the first light module 108(1) may include different components or arrangements of components. For example, light sources 202 positioned near the end of a light module 108 may be associated with a light bending film 304 that redirects the emitted light at a different angle relative to the field of view 110 than light sources 202 associated with a central portion of a light module 108. Continuing the example, light sources 202 proximate to the ends of the light modules 108 may include light bending films 304 that cause emitted light to be angled inward from the corners or outward from the corners. Additionally, different diffusers 308 that redirect light toward different portions of the field of view 110 may be used in association with different light sources 202.

As shown in the second diagrammatic view 300(2) of FIG. 3, the third light module 108(3) may include a base 302 positioned over the light sources 202. The base 302 may include the same type of base 302 described with regard to the first light module 108(1), or a different type of base 302.

The third light module 108(3) may include a polarizer 310 (2) positioned adjacent to the base 302. The polarizer 310(2) may provide light emitted by the third light module 108(3) with a polarization suitable for visualization of features beneath the surface of a hand 102 or other object. For example, the polarizer 310(2) associated with the third light module 108(3) may provide emitted light with a polarization that differs from that associated with the first light module 108 (1) and the second light module 108(2). As a result, when a hand 102 is illuminated by light from the third light module 108(3), internal anatomical structures, such as veins, bones, soft tissue, or other structures beneath the epidermis of the skin may predominate in an image acquired by the camera 106. The polarizer 310(2) may be secured adjacent to the base 302 in a manner that maintains an air gap 306(3) between the polarizer 310(2) and the base 302, such as through use of one or more spacers.

A diffuser 308 may be positioned adjacent to the polarizer 310(2). The diffuser 308 may include the same type of diffuser 308 described with regard to the first light module 108 (1) or a different type of diffuser 308. For example, the diffuser 308 of the third light module 108(3) may include a rectangular diffuser having a long axis perpendicular to a line extending between the camera 106 and the third light module 108(3). In other implementations, other types of diffusers 308, such as a square diffuser in which both axes are equal, may be used. The diffuser 308 may redirect at least a portion of the light emitted by the third light module 108(3) from a first portion of the field of view 110 to a second portion thereof.

The diffuser 308 may be secured adjacent to the polarizer 310(2) in a manner that defines an air gap 306(4) between the diffuser 308 and the polarizer 310(2), such as through use of one or more spacers. Inclusion of an air gap 306(4) between the diffuser 308 and adjacent components enables surface features of the diffuser 308 to redirect light. For example, abutment between the diffuser 308 and other components or filling of the surface features of the diffuser 308 with an adhesive may hinder the functionality of the diffuser 308.

While FIG. 3 depicts the third light module 108(3) having a polarizer 310(2) positioned beneath a diffuser 308, in other implementations, the components of the third light module 108(3) may include other arrangements. For example, the polarizer 310(2) may be positioned above the diffuser 308. Additionally, while FIG. 3 does not depict a light bending film 304 associated with the third light module 108(3), in some implementations, a light bending film 304 may be used to direct at least a portion of the light emitted by the third light module 108(3) outward from the camera 106, toward an edge 116 of the field of view 110, such as the edge 116 of the field of view 110 closest to the third light module 108(3). Additionally, as described previously, the fourth light module 108(4) may include an identical arrangement of components to those described with regard to the third light module 108(3). However, in other implementations, the third light module 108(3) and fourth light module 108(4) may include different arrangements of components. For example, the third light module 108(3) and fourth light module 108(4) may include different types of diffusers 308 that redirect light differently. The third light module 108(3) and fourth light module 108(4) may each include a polarizer 310(2) that provides the emitted light with a polarization suitable for visualization of internal features of a hand 102 or other object, such that the third light module 108(3) and fourth light module 108(4) may be operated simultaneously to illuminate an object within the field of view 110 and facilitate acquisition of images that visualize internal features of the object.

Additionally, while the second diagrammatic view 300(2) of FIG. 3 depicts an arrangement of components that may be associated with the entire third light module 108(3), in other implementations, particular light sources 202 or sets of light sources 202 within the third light module 108(3) may include different components or arrangements of components. For example, light sources 202 positioned near the end of a light module 108 may be associated with a diffuser 308 that redirects light differently than light sources 202 associated with a central portion of a light module 108.

Figure 4:
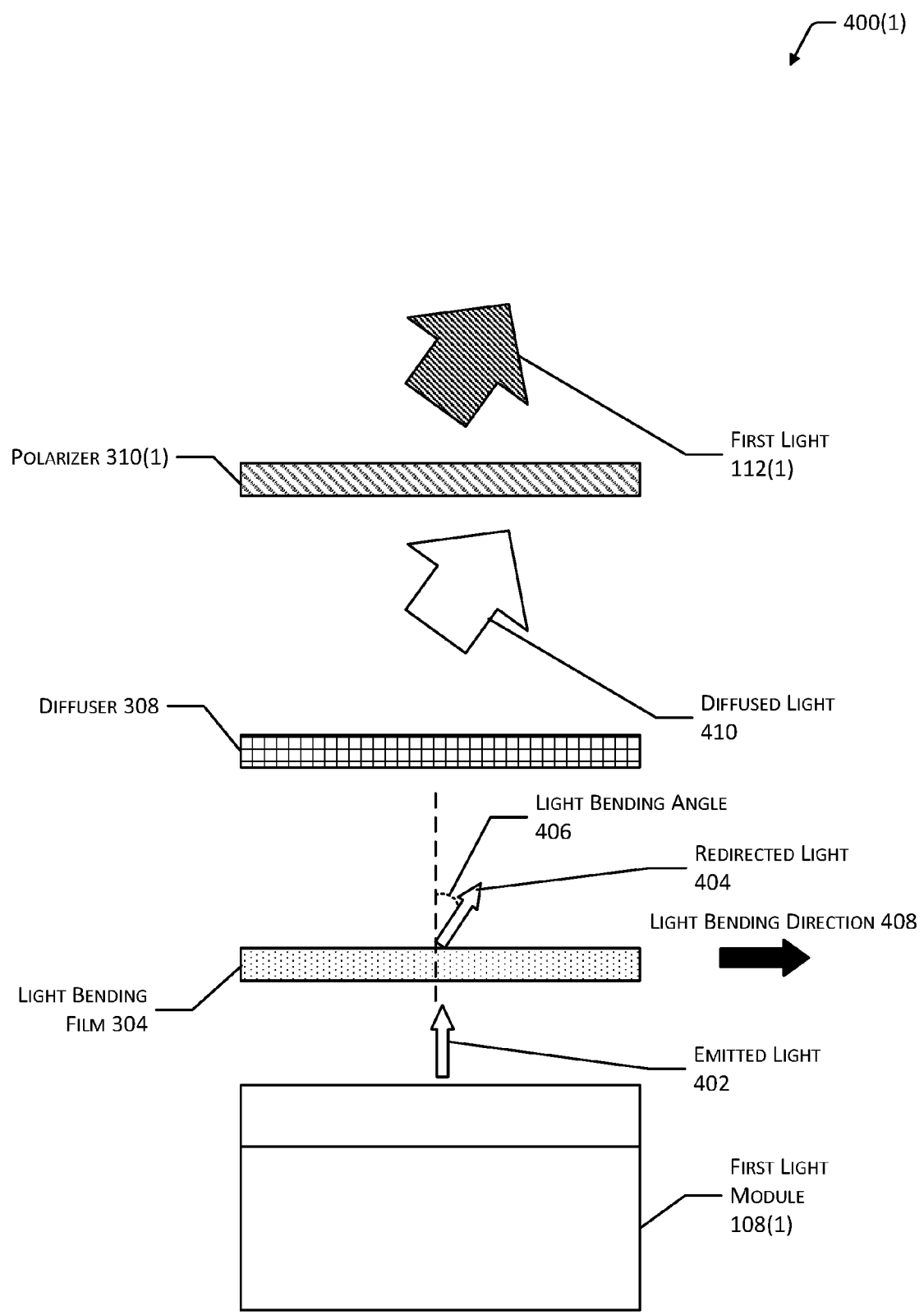
FIG. 4 depicts a deconstructed diagrammatic side view illustrating an implementation of the functionality of the modifiers of the first light module shown in FIG. 3.

FIG. 4 depicts a deconstructed diagrammatic side view 400 illustrating an implementation of the functionality of the modifiers of the first light module 108(3) shown in FIG. 3. As described previously, the first light module 108 (1) may include one or more light sources 202. The light source(s) 202 may generate emitted light 402 at a first angle extending outward from the first light module 108(1) toward the field of view 110 of the camera 106. While FIG. 4 depicts the emitted light 402 projecting from the first light module 108(1) in a linear direction outward from the first light module 108(1), in other implementations, the emitted light 402 may be emitted in a cone, an arc, or other light patterns. Illumination of an object within the field of view 110 using the emitted light 402 at the initial angle shown in FIG. 4 may cause lighter and darker regions when acquiring images of objects having an irregular shape, such as a hand 102. As such, the first light module 108(1) may include a light bending film 304 that redirects the emitted light 402 from the initial first angle to a second angle to form redirected light 404 that is directed outward relative to the camera 106 (e.g., redirected from a center 114 of the field of view 110 toward an edge 116 of the field of view 110).

For example, FIG. 4 depicts the light bending film 304 redirecting the emitted light 402 from an initial angle, generally perpendicular to the surface of the first light module 108(1), to a light bending angle 406(1), illustrated by an arrow indicating a light bending direction 408 for the light bending film 304. As described previously, the light bending direction 408 of the light bending film 304 may redirect (e.g., refract or diffract) at least a portion of the emitted light 402 away from the center 114 of the field of view 110 toward the edge 116 of the field of view 110 that is closest to the first light module 108(1). In some implementations, the light bending angle 406 may range from 10 degrees to 40 degrees, in the light bending direction 408, relative to an axis extending outward from and perpendicular to the first light module 108(1). In one implementation, the light bending angle 406 may be 30 degrees. In another implementation, the light bending angle 406 may be 20 degrees.

The second light module 108(2) (not shown in FIG. 4) may also include one or more light sources 202 and a light bending film 304 that redirects emitted light 402 from the second light module 108(2) in a light bending direction 408 opposite the light bending direction 408 shown with regard to the first light module 108(1). For example, redirected light 404 from the second light module 108(2) may be directed at a light bending angle 406 that is equal in magnitude to the light bending angle 406 of the first light module 108(1), but in an opposite direction. For example, light from the second light module 108(2) may be directed, by a light bending film 304, away from the center 114 of the field of view 110 toward the edge 116 of the field of view 110 that is closest to the second light module 108(2), which may be the edge of the field of view 110 opposite the edge 116 that is closest to the first light module 108(1).

FIG. 4 also illustrates the functionality of a diffuser 308 associated with the first light module 108(1). As described previously, a diffuser 308 may receive incident light, such as the redirected light 404 that passes through the light bending film 304. The diffuser 308 may in turn redirect the light to different portions of the field of view 110. Redirecting of the light by the diffuser 308 may increase the area illuminated by the redirected light 404, forming diffused light 410. In some cases, the diffuser 308 may be oriented to direct a greater portion of light emitted by the light module 108 and incident to the diffuser 308 along an edge 116 of the field of view 110 rather than toward the center 114 thereof. For example, the diffuser 308 may include a rectangular diffuser having a long axis that is oriented perpendicular to a line extending from the camera 106 to the first light module 108(1). In such a case, the diffuser 308 may distribute a greater portion of the diffused light 410 along the edge 116 of the field of view 110 closest to the first light module 108 (1).

As shown in FIG. 4, diffused light 410 that passes through the diffuser 308 may then pass through a polarizer 310(1) associated with the first light module 108(1), which may cause the first light 112(1) emitted by the first light module 108(1) to have a first polarization suitable for visualization of surface features of a hand 102 or other object. The second light module 108(2) may include the same type of polarizer 310(1) associated with the first light module 108(1), or a different type of polarizer 310(1) that provides light emitted by the second light module 108(2) with the same or a similar polarization. As such, the first light module 108(1) and second light module 108(2) may be used to illuminate an object in the field of view 110 of the camera 106 with light having the first polarization, facilitating the acquisition of images that depict surface features of the object. In other implementations, use of a polarizer 310(1) may be omitted.

The third light module 108(3) may include a polarizer 310(2) that provides third light 112(3) emitted by the third light module 108(3) with a second polarization suitable for visualization of internal features of a hand 102 or other object. Polarized third light 112(3) that passes through the polarizer 310(2) of the third light module 108(3) may have the second polarization. The fourth light module 108(4) may include the same type of polarizer 310(2) as the third light module 108(3), or a different type of polarizer 310(2) that provides the same or a similar polarization. As such, the third light module 108(3) and fourth light module 108(4) may be used to illuminate an object in the field of view 110 of the camera 106 with light having the second polarization, facilitating the acquisition of images that depict internal features of the object.

Figure 5:
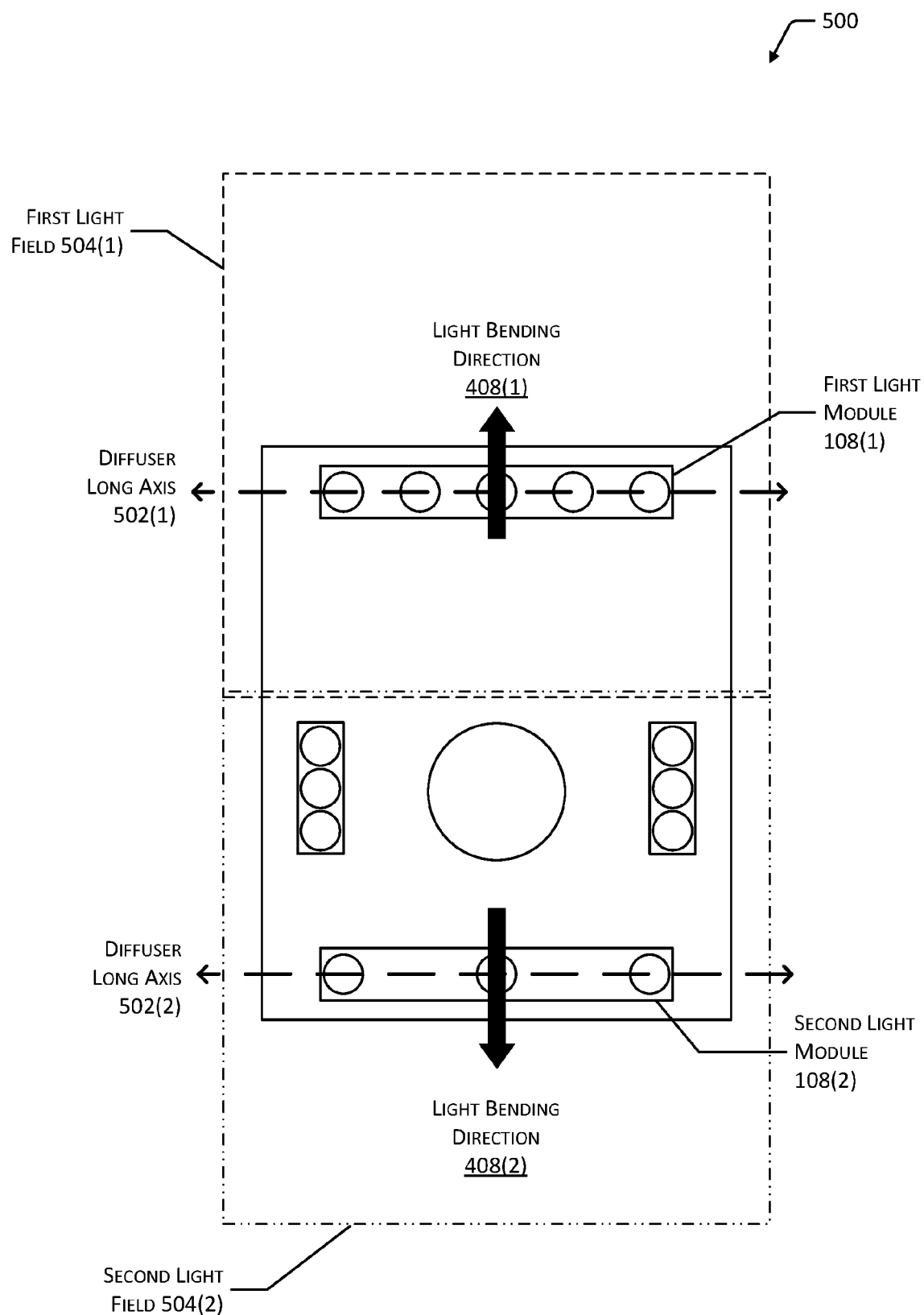
FIG. 5 depicts a diagrammatic top view illustrating the functionality of the light bending film and diffuser of FIG. 4.

FIG. 5 depicts a diagrammatic top view 500 illustrating the functionality of the light bending film 304 and diffuser 308 of FIG. 4. As described with regard to FIGS. 3 and 4, a light bending film 304 associated with the first light module 108(1) may redirect light from the first light module 108(1) away from a center 114 of the field of view 110 of the camera 106 toward an edge 116 of the field of view 110 closest to the first light module 108(1). For example, as illustrated in FIG. 5, the first bending direction 408(1) associated with the light bending film 304 of the first light module 108(1) directs light from the first light module 108(1) outward from the camera 106. The diffuser 308 associated with the first light module 108(1) may have a diffuser long axis 502(1) that extends parallel to the edge 116 of the field of view 110 closest to the first light module 108(1) (e.g., perpendicular to a line that would extend from the camera 106 to the first light module 108(1)). As such, the diffuser 308 may direct a greater portion of light from the first light module 108(1) along the edge 116 of the field of view 110 rather than toward the center 114. The resulting first light field 504(1) of the first light module 108(1) therefore provides less illumination to the center 114 of the field of view 110 and a greater illumination to the edge 116 of the field of view 110 closest to the first light module 108(1), when compared to the illumination that would be provided by the emitted light 402 from the first light module 108(1) in the absence of the light bending film 304 and diffuser 308.

The second light module 108(2) may also include a light bending film 304 that redirects light from the second light module 108(2) away from the center 114 of the field of view 110 and toward an edge 116 of the field of view 110 closest to the second light module 108(2) (and opposite the edge 116 closest to the first light module 108(1)). For example, the light bending direction 408(2) shown in association with the second light module 108(2) extends in an opposite direction from the light bending direction 408(1) associated with the first light module 108(1). The diffuser 308 associated with the second light module 108(2) may have a diffuser long axis 502(2) that extends parallel to the edge 116 of the field of view 110 closest to the second light module 108(2) (e.g., perpendicular to a line that would extend from the camera 106 to the second light module 108(2)). The diffuser 308 may therefore direct a greater portion of light from the second light module 108(2) along the edge 116 of the field of view 110 closest to the second light module 108(2) rather than toward the center 114. The resulting second light field 504(2) of the second light module 108(1) therefore provides less illumination to the center 114 of the field of view 110 and a greater illumination to the edge 116 of the field of view 110 closest to the second light module 108(2). Use of light bending films 304 and diffusers 308 with both the first light module 108(1) and second light module 108(2) may reduce the likelihood of over-illumination at the center 114 of the field of view 110, which may cause glare or hotspots in acquired images, while also reducing the likelihood of darker regions near the edges 116 of the field of view 110.

Figure 6:
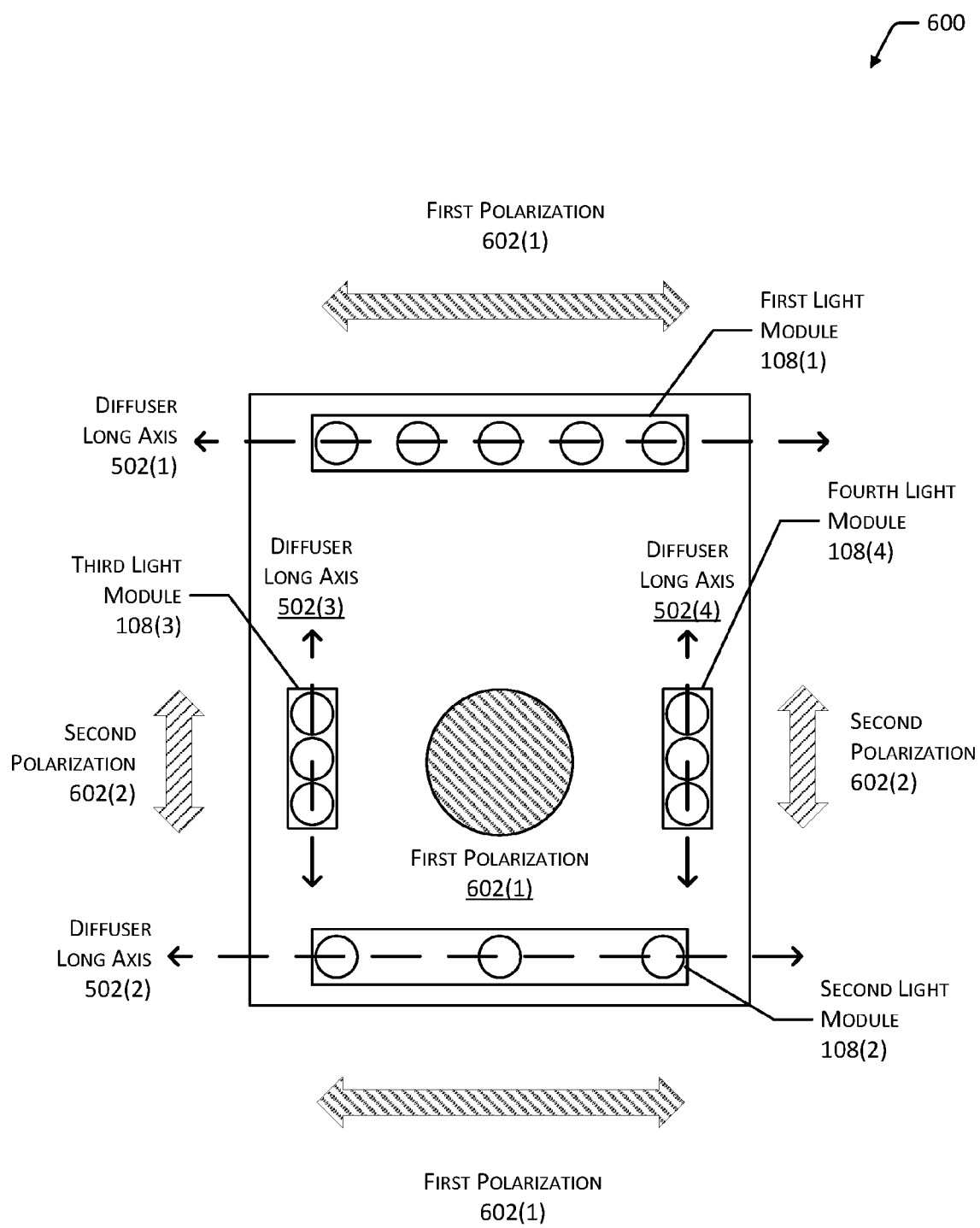
FIG. 6 depicts a plan view illustrating a functionality of the diffusers and polarizers associated with each of the light modules.

FIG. 6 depicts a plan view 600 illustrating the functionality of the diffusers 308 and polarizers 310 of each of the light modules 108. As described previously, with regard to FIGS. 4-5, the diffusers 308 associated with each light module 108 may redirect light along one or more edges 116 of the field of view 110 of the camera 106. For example, the diffuser 308 associated with a light module 108 may include a rectangular diffuser oriented to position a diffuser long axis 502 along an edge 116 of the field of view 110 closest to the light module 108. For example, the diffuser long axis 502 of each diffuser 308 may be oriented perpendicular to a line extending from the camera 106 to the light module 108 associated with the diffuser 308.

Continuing the example, as shown in FIG. 6, the diffuser long axis 502(1) of a diffuser 308 associated with the first light module 108(1) may extend parallel to the first light module 108(1) and perpendicular to a line that would extend between the first light module 108(1) and the camera 106. Similarly, the diffuser long axis 502(2) of a diffuser 308 associated with the second light module 108(2) may extend parallel to the second light module 108(2) (and to the diffuser long axis 502(1) associated with the first light module 108(1)), and perpendicular to a line that would extend between the second light module 108(2) and the camera 106. The diffuser long axis 502(3) of a diffuser 308 associated with the third light module 108(3) may extend parallel to the third light module 108(3) and perpendicular to a line that would extend between the third light module 108(3) and the camera 106. The diffuser long axis 502(4) of a diffuser 308 associated with the fourth light module 108(4) may extend parallel to the fourth light module 108(4) (and to the diffuser long axis 502(3) associated with the third light module 108(3)) and perpendicular to a line that would extend between the fourth light module 108(4) and the camera 106. The orientation of the diffusers 308 associated with each of the light modules 108 may distribute light from the light modules 108 toward the edges 116 of the field of view 110 of the camera 106. In other implementations, diffusers 308 having other shapes or orientations may be used. For example, a square diffuser 308 or a diffuser 308 having another shape that lacks a long axis 502 may be used to increase the area illuminated by the light modules 108.

The polarizers 310 associated with the first light module 108(1) and second light module 108(2) may provide light from the first light module 108(1) and second light module 108(1) with the same or a similar polarization that is suitable for visualization of surface features of an object. As such, the first light module 108(1) and second light module 108(2) are shown associated with light having a first polarization 602(1), as illustrated by the horizontal directional arrows adjacent to the first light module 108(1) and second light module 108(2). Similarity, the polarizers 310 associated with the third light module 108(3) and fourth light module 108(4) may provide emitted light 402 with the same or a similar polarization that is suitable for visualization of internal features of an object. As such, the third light module 108(3) and fourth light module 108(4) are shown associated with light having a second polarization 602(2) that differs from the first polarization 602(1), as illustrated by the vertical directional arrows adjacent to the third light module 108(3) and fourth light module 108(3). As shown in FIG. 6 and described with regard to FIG. 1, in some implementations, the camera 106 may include a camera polarizer 120 that limits light that reaches the image sensor of the camera 106 to a selected polarization 602(1). For example, FIG. 6 depicts the camera 106 having the first polarization 602(1) associated with the first light module 108(1) and second light module 108(2).

Figure 7:
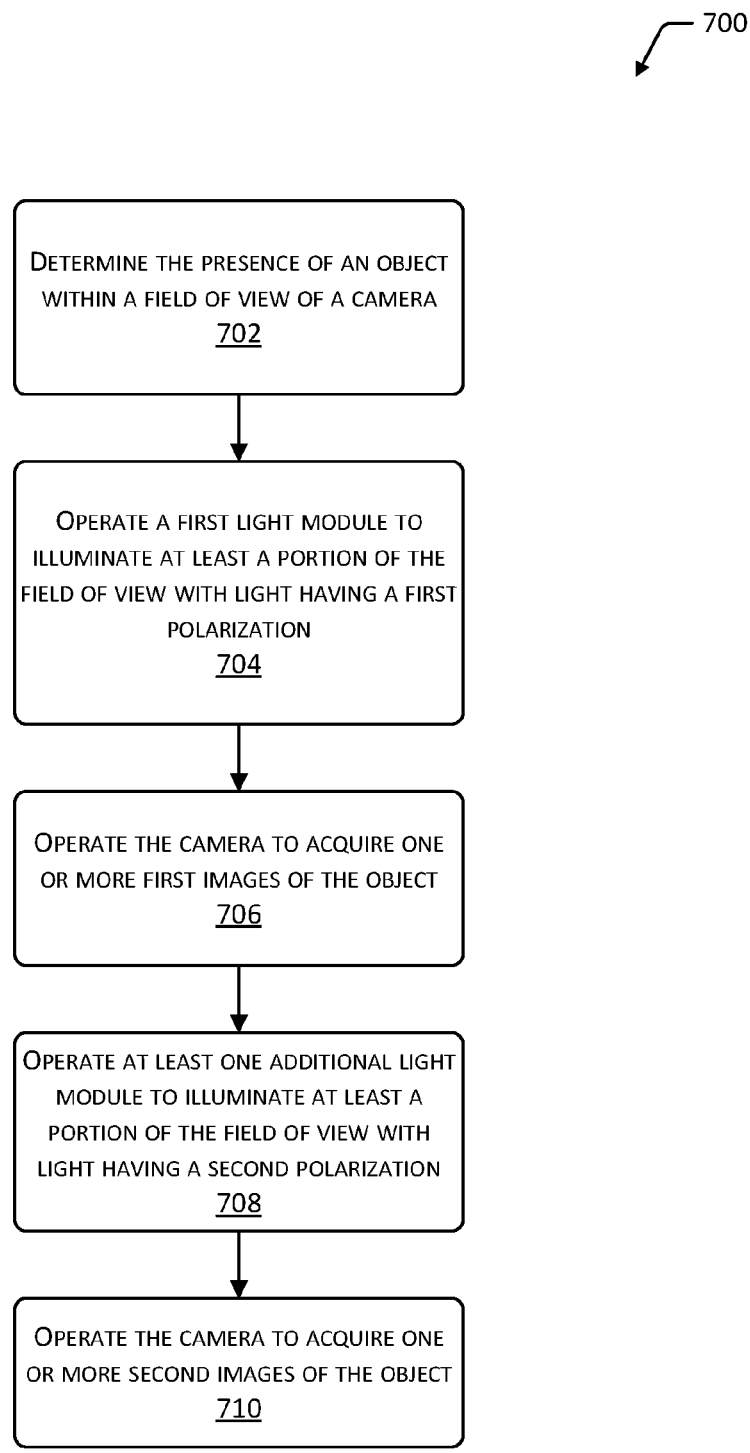
FIG. 7 is a flow diagram illustrating an implementation of a method for acquiring one or more images using a sensor assembly within the present disclosure.

FIG. 7 is a flow diagram 700 illustrating an implementation of a method for acquiring one or more images using a sensor assembly 100 within the present disclosure. At 702, the presence of an object within a field of view 110 of a camera 106 may be determined. For example, a proximity sensor, a capacitive sensor, or another type of sensor may be used to determine the presence of a user's hand 102 or other object within the field of view 110 of the camera 106. For example, a sensor may generate sensor data indicative of an object within the field of view 110. In some implementations, a camera external to the sensor assembly 100 or the camera 106 of the sensor assembly 100, itself, may be used to visualize the position of the object relative to the camera 106.

At 704, a first light module 108(1) may be operated to illuminate at least a portion of the field of view 110 with light having a first polarization 602(1). In some implementations, multiple light modules 108, such as a first light module 108(1) and a second light module 108(2), as shown in FIGS. 1-6, may be operated to illuminate the field of view 110. For example, the first light module 108(1) and the second light module 108(2) may be associated with polarizers 310 that provide light emitted by the light modules 108 with the first polarization 602(1), which may be suitable for visualization of surface features of a hand 102 or other object. At 706, the camera 106 may be operated to acquire one or more first images of the object while the object is illuminated by light from the first light module 108(1).

At 708, at least one additional light module 108 may be operated to illuminate a least a portion of the field of view 110 with light having a second polarization 602(2). For example, as described with regard to FIGS. 1-6, a third light module 108(3) and fourth light module 108(4) may be associated with polarizers 310 that provide light emitted by the light modules 108 with the second polarization 602(2), which may be suitable for visualization of internal features of a hand 102 or other object. At 710, the camera 106 may be operated to acquire one or more second images of the object while the object is illuminated by light from the additional light module 108.

The images of the object may be used for a variety of purposes, such as to provide access to an area, payment method, and so forth. For example, images of the surface and internal features of a user's hand 102 may be used to authorize payment for a purchase, accept delivery of an item, gain access to a facility, and so forth.

Figure 8:
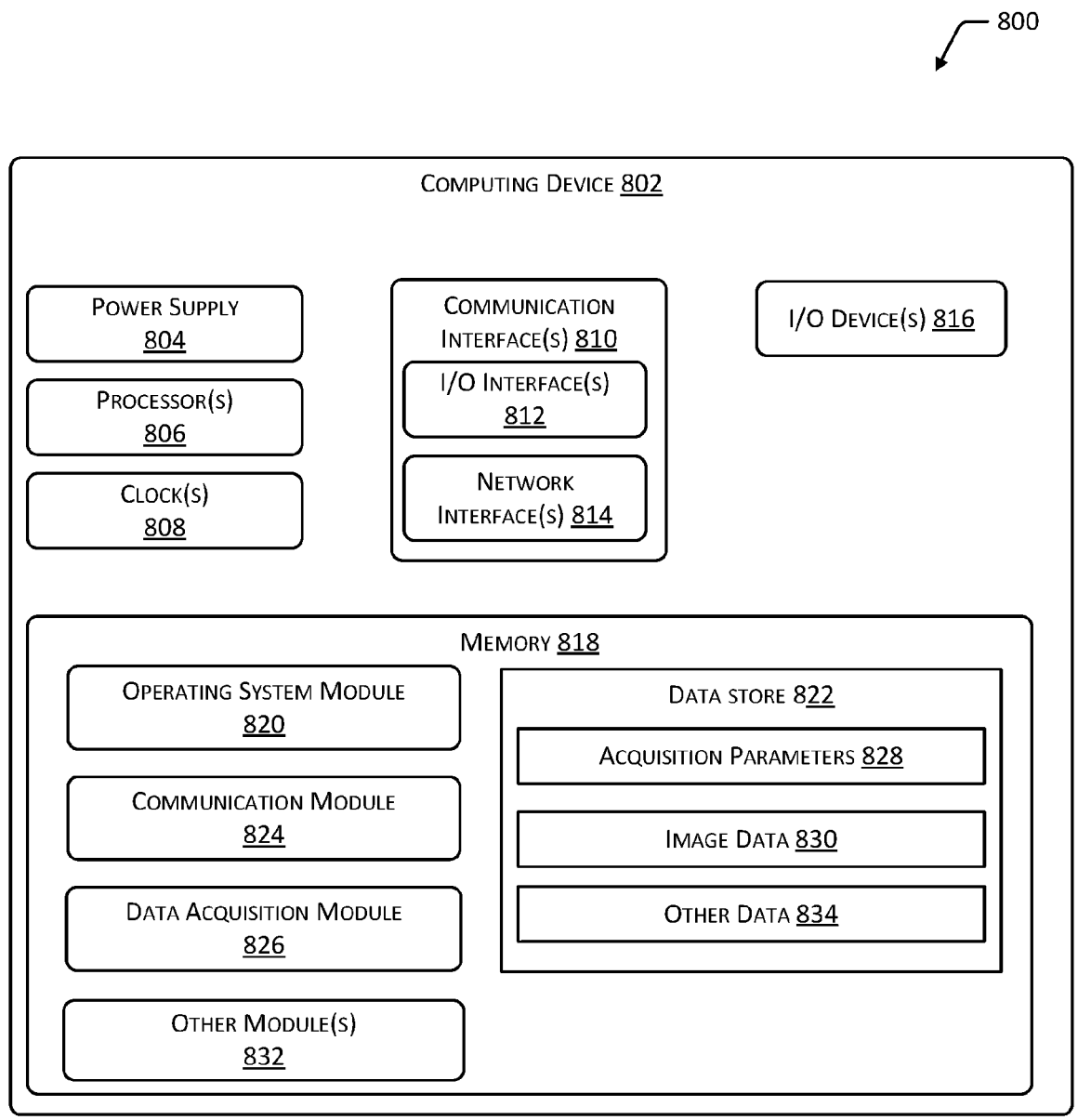
FIG. 8 is a block diagram illustrating an implementation of a computing device within the present disclosure.

FIG. 8 is a block diagram 800 illustrating an implementation of a computing device 802 within the present disclosure. The computing device 802 may include a device that incorporates a sensor assembly 100 having the circuit board 104 shown in FIGS. 1-2, or one or more other computing devices 802 in communication therewith. For example, the device incorporating the sensor assembly 100 may include a processor, memory, and so forth that may be used to operate the light modules 108 and camera 106 to acquire and process images in response to user input, sensor input, and so forth. Alternatively or additionally, one or more other computing devices 802 may be used to provide signals or commands to the device to cause operation of the light modules 108 or camera 106. While FIG. 8 depicts a single block diagram 800 of a computing device 802, any number and any type of computing devices 802 may be used to perform the functions described herein.

One or more power supplies 804 may be configured to provide electrical power suitable for operating the components in the computing device 802. In some implementations, the power supply 804 may include an external power supply that is supplied by line voltage, rechargeable battery, fuel cell, photovoltaic cell, power conditioning circuitry, wireless power receiver, and so forth.

The computing device 802 may include one or more hardware processors 806 (processors) configured to execute one or more stored instructions. The processors 806 may include one or more cores. One or more clocks 808 may provide information indicative of date, time, ticks, and so forth. For example, the processor 806 may use data from the clock 808 to generate a timestamp, trigger a preprogrammed action, and so forth.

The computing device 802 may include one or more communication interfaces 810 such as input/output (I/O) interfaces 812, network interfaces 814, and so forth. The communication interfaces 810 may enable the computing device 802, or components thereof, to communicate with other computing devices 802 or components of the other computing devices 802. The I/O interfaces 812 may include interfaces such as Bluetooth, ZigBee, Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input devices or output devices associated with the computing device 802. For example, I/O devices 816 may include touch sensors, displays, touch sensors integrated with displays (e.g., touchscreen displays), keyboards, mouse devices, microphones, image sensors, cameras 106, scanners, speakers or other types of audio output devices, haptic devices, printers, and so forth. For example, the I/O devices 816 may include one or more proximity sensors that may generate sensor data that indicates the presence of an object in the field of view 110 of the camera 106, the camera 106 itself, a card reader or other mechanism for acquiring input from an external source, and so forth. A proximity sensor may be used to detect the presence of an object outside of the field of view 110 as well. For example, a proximity sensor may be arranged to detect a user approaching a device incorporating the sensor assembly 100. Responsive to this detection, the device may be caused to present information on the display, illuminate visible light sources, operate the camera 106 or light modules 108, and so forth. The computing device 802 may also include various switches, touch sensors, or other controls. I/O devices 816 may also include output devices such as visible lights that indicate the presence of an object in the field of view 110, successful or unsuccessful acquisition of an image, and so forth. The light modules 108 themselves may also constitute I/O devices 816. In some implementations, the I/O devices 816 may be physically incorporated with the computing device 802. In other implementations, I/O devices 816 may be externally placed.

The network interfaces 814 may be configured to provide communications between the computing device 802 and other devices, such as access points, point-of-sale devices, payment terminals, servers, and so forth. The network interfaces 814 may include devices configured to couple to wired or wireless personal area networks (PANs), local area networks (LANs), wide area networks (WANs), and so forth. For example, the network interfaces 814 may include devices compatible with Ethernet, Wi-Fi, 4G, 5G, LTE, and so forth.

The computing device 802 may also include one or more busses or other internal communications hardware or software that allow for the transfer of data between the various modules and components of the computing device 802.

The computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SOC).

The memory 818 may include at least one operating system (OS) module 820. The OS module 820 may be configured to manage hardware resource devices such as the I/O interfaces 812, the network interfaces 814, the I/O devices 816, and provide various services to applications or modules executing on the processors 806. The OS module 820 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Washington, USA; the Android operating system from Google Corporation of Mountain View, California, USA; the iOS operating system from Apple Corporation of Cupertino, California, USA; or other operating systems.

One or more data stores 822 and one or more of the following modules may be stored in the memory 818. The modules may be executed as foreground applications, background tasks, daemons, and so forth. The data store(s) 822 may use a flat file, database, linked list, tree, executable code, script, or other data structure to store information. In some implementations, the data store(s) 822 or a portion of the data store(s) 822 may be distributed across one or more other devices including other computing devices 802, network attached storage devices, and so forth.

A communication module 824 may be configured to establish communications with one or more other computing devices 802. The communications may be authenticated, encrypted, and so forth. The communication module 824 may also control the communication interfaces 810.

A data acquisition module 826 may be configured to acquire data from one or more of the I/O devices 816. One or more acquisition parameters 828 may be stored in the memory 818. The acquisition parameters 828 may specify operation of the data acquisition module 826, such as a data sample rate, sample frequency, scheduling, and so forth. The data acquisition module 826 may be configured to operate the camera 106, light modules 108, and so forth. For example, the data acquisition module 826 may acquire data from a proximity sensor, the camera 106, or one or more other sensors to determine that an object is in the field of view 110 of the camera 106. Based on this determination, a first set of light modules 108 may be operated to provide illumination with a first polarization while the camera 106 is used to acquire images. At a second time, a second set of light modules 108 may be activated to provide illumination with a second polarization while the camera 106 is used to acquire images.

In some implementations, data from the camera 106 may be used to determine the presence of an object in the field of view 110. For example, the camera 106 and one or more light modules 108 may be operated at a first sample rate, such as acquiring images and providing illumination at a rate of 10 times per second. In some implementations, a device that includes the camera 106 may be configured to determine whether ambient light may be sufficient to allow acquisition of an image for object detection in the field of view 110 without use of the light modules 108. An acquired image may be processed to determine if changes in the image exceed a threshold value. For example, a first image may be compared with a second image to determine if there is a change. A change that exceeds the threshold value may indicate an object within the field of view 110. Responsive to the change, the camera 106 and light module 108 may be operated as described above, acquiring images with different polarizations of light. In other implementations other techniques may be used to initiate acquisition of images with different polarizations of light. For example, if a neural network determines a hand 102 is present in the image, the sample rate of the camera 106 may be increased and the camera 106 and light modules 108 may operate as described above to acquire images with different polarizations of light.

Image data 830 representative of acquired images may be sent to another computing device 802, processed by the processor 806, and so forth. For example, in one implementation the image data 830 may be processed to determine one or more features present in the image data 830. Data indicative of the features may be encrypted and sent to an external device, such as a server.

The data acquisition module 826 may also obtain data from one or more of the I/O devices 816 or external devices. For example, card data may be obtained from a card reader or other type of input device. Other types of input data may be obtained from other sensors, such as a switch, touch sensor, and so forth.

Other modules 832 may include a feature determination module that generates feature vectors that are representative of features present in the image data 830. The feature determination module may utilize one or more neural networks that accept image data 830 as input and provide one or more feature vectors as output. Other modules 832 may include modules for encrypting and authenticating communications, receiving and modifying configurations of the computing device 802, and so forth. Other modules 832 may also include a user interface module that provides a user interface for using one or more of the I/O devices 816. For example, a user interface module may be used to obtain input from a user, present information to the user, and so forth, and may provide output to the user.

Other data 834 may also be stored in the data store 822. For example, device identification data stored in the data store may provide information that is indicative of the specific computing device 802 or a device that is controlled by the computing device 802. For example, device identification data may include a cryptographically signed digital signature. Other data 834 may also include user data, such as characteristics of an image that may be used to identify a particular user. For example, image data 830 acquired using the camera 106 may be used to identify a user based on correspondence between the acquired image data 830 and user data.

The devices and techniques described in this disclosure may be used in a variety of settings. For example, the computing device 802 may be used in conjunction with a point-of-sale (POS) device. A user may present their hand 102 to a device that is used to obtain image data 830 indicative of intent and authorization to pay with an account associated with their identity. In another example, a robot may incorporate a device that acquires such input. The robot may use the device to obtain image data 830 that is then used to determine whether to deliver a parcel to a user, and based on the identification, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   a circuit board;
   a camera at a first position with respect to the circuit board;
   a first light module mounted to the circuit board on a first side of the camera, wherein the first light module is positioned at a first distance from the camera, the first light module comprising:
      a first set of one or more light sources that emit first light when operated;
      a first light bending film positioned over the first set, wherein the first light bending film redirects a portion of the first light from a first angle to a second angle that is away from a center of a field of view of the camera and toward a first edge of the field of view;
      a first diffuser positioned over the first set, wherein the first diffuser has a first long axis perpendicular to a line between the camera and the first light module and redirects the portion of the first light; and
      a first polarizer, with a first polarization, positioned over the first set;
   a second light module mounted to the circuit board on a second side of the camera opposite the first side, wherein the second light module is positioned at a second distance from the camera that is less than the first distance, the second light module comprising:
      a second set of one or more light sources that emit second light when operated;
      a second light bending film positioned over the second set, wherein the second light bending film redirects the second light from a third angle to a fourth angle that is away from the center of the field of view and toward a second edge of the field of view opposite the first edge;
      a second diffuser positioned over the second set, wherein the second diffuser has a second long axis perpendicular to the line between the camera and the first light module and redirects a portion of the second light; and
      a second polarizer, with the first polarization, positioned over the second set;
   one or more memories storing computer-executable instructions; and
   one or more hardware processors to execute the computer-executable instructions to:
      operate the first light module and the second light module to illuminate the field of view with the first light and the second light, wherein a first intensity of the first light is greater than a second intensity of the second light; and
      operate the camera to generate image data.

2. The device of claim 1, further comprising:
   a third light module mounted to the circuit board, wherein the third light module emits third light, the third light module comprising:
      a third set of one or more light sources;

a third diffuser positioned over the third set, wherein the third diffuser directs a portion of the third light toward the field of view; and
a third polarizer positioned over the third set, wherein the third polarizer has a second polarization that differs from the first polarization; and
computer-executable instructions to:
operate the third light module.

3. A device comprising:
a housing;
an image sensor within the housing;
a first light module within the housing at a first position that is a first distance from the image sensor, wherein the first light module emits first light at a first intensity;
a first light bending film that directs at least a portion of the first light from a first angle relative to a field of view of the image sensor to a second angle relative to the field of view;
a first polarizer that applies a first polarization to the at least a portion of the first light; and
a second light module within the housing at a second position that is a second distance from the image sensor, wherein the second light module emits second light at a second intensity less than the first intensity;
wherein the first distance is greater than the second distance.

4. The device of claim 3, wherein the first light module includes a first count of light sources of a first type, the second light module includes a second count of light sources of the first type, and the first count is greater than the second count.

5. The device of claim 3, wherein:
the first light module includes a first light source that emits the first light; and
the first light bending film is positioned adjacent to the first light source and redirects the first light emitted by the first light source away from a center of the field of view;
the device further comprising:
a first diffuser positioned adjacent to the first light bending film, wherein the first diffuser redirects the at least a portion of the first light from a first portion of the field of view to a second portion of the field of view;
wherein the first polarizer is positioned adjacent to the first diffuser, and the first light passes through the first polarizer and is provided with the first polarization.

6. The device of claim 3, further comprising:
a second polarizer positioned to polarize the second light emitted from the second light module, wherein the second polarizer has the first polarization;
a third light module that emits third light; and
a third polarizer positioned to polarize the third light emitted from the third light module, wherein the third polarizer has a second polarization that differs from the first polarization.

7. The device of claim 6, further comprising:
one or more memories storing computer-executable instructions; and
one or more hardware processors to execute the computer-executable instructions to:
at a first time, operate the first light module and the second light module to illuminate the field of view of the image sensor with the first light and the second light having the first polarization;
at a second time subsequent to the first time, operate the image sensor to acquire a first image;
at a third time, operate the third light module to illuminate the field of view with the third light having the second polarization; and
at a fourth time subsequent to the third time, operate the image sensor to acquire a second image.

8. The device of claim 3, wherein the first light bending film is positioned adjacent to the first light module and directs the at least a portion of the first light away from a center of the field of view of the image sensor in a first direction.

9. The device of claim 8, further comprising:
a second light bending film positioned adjacent to the second light module, wherein the second light bending film directs at least a portion of the second light away from the center of the field of view in a second direction opposite the first direction.

10. The device of claim 8, further comprising a first diffuser that redirects the at least a portion of the first light from a first portion of a first edge of the field of view to a second portion of the first edge.

11. The device of claim 3, further comprising:
a first sensor oriented to detect an object within the field of view of the image sensor;
a second polarizer positioned to polarize at least a portion of the second light emitted by the second light module, wherein the second polarizer has the first polarization;
a third light module within the housing, wherein the third light module emits third light;
a third polarizer positioned to polarize at least a portion of the third light emitted by the third light module, wherein the third polarizer has a second polarization that differs from the first polarization;
one or more memories storing computer-executable instructions; and
one or more hardware processors to execute the computer-executable instructions to:
receive sensor data from the first sensor, wherein the sensor data indicates that the object is within the field of view;
in response to the sensor data, at a first time, actuate the first light module and the second light module to illuminate the field of view with the first light and the second light;
operate the image sensor to generate first image data representing the object;
at a second time, operate the third light module to illuminate the field of view with the third light; and
operate the image sensor to generate second image data representing the object.

12. A system comprising:
an image sensor; and
a first light module at a first position with respect to the image sensor, the first light module comprising:
a first light source that emits first light at a first intensity and at a first angle relative to a field of view of the image sensor;
a first light bending film positioned to redirect the first light from the first angle to a second angle relative to the field of view to direct the first light away from a center of the field of view in a first direction; and
a first diffuser positioned to redirect a portion of the first light from a first portion of the field of view to a second portion of the field of view.

13. The system of claim 12, wherein the first light bending film is positioned between the first light source and the first diffuser.

14. The system of claim 13, further comprising an air gap between the first diffuser and the first light bending film.

15. The system of claim 13, further comprising an air gap between the first light bending film and the first light module.

16. The system of claim 12, further comprising:

a first polarizer, having a first polarization, that is positioned to polarize the first light emitted by the first light module, wherein the first diffuser is positioned between the first light bending film and the first polarizer.

17. The system of claim 12, further comprising:

a second light module at a second position with respect to the image sensor, the second light module comprising:

a second light source that emits second light at a second intensity less than the first intensity and at a third angle relative to the field of view;

a second light bending film positioned to redirect the second light from the third angle to a fourth angle relative to the field of view to direct the second light away from the center of the field of view in a second direction opposite the first direction; and a second diffuser positioned to redirect a portion of the second light from a third portion of the field of view to a fourth portion of the field of view.

18. The system of claim 17, further comprising a circuit board associated with the image sensor, first light module, and second light module, wherein a first distance between the image sensor and the first light module along a plane of the circuit board is greater than a second distance between the image sensor and the second light module along the plane of the circuit board.

19. The system of claim 12, further comprising:

a first polarizer, having a first polarization, that is positioned to polarize the first light emitted by the first light module;

a second light module having a second light source that emits second light;

a second polarizer positioned to polarize the second light emitted by the second light source, wherein the second polarizer has a second polarization;

one or more memories storing computer-executable instructions; and one or more hardware processors to execute the computer-executable instructions to:

operate the first light module to illuminate the field of view with the first light having the first polarization; and operate the second light module to illuminate the field of view with the second light having the second polarization.

20. The system of claim 12, wherein the first light module further includes a second light source, and the first light bending film is positioned adjacent to the first light source, the first light module further comprising:

a second light bending film positioned to redirect second light from the second light source from the first angle to a third angle relative to the field of view that differs from the second angle.

21. A device comprising:

an image sensor, wherein the image sensor has a field of view;

a first light source on a first side of the image sensor, wherein the first light source emits first light at a first angle relative to a center of the field of view;

a first modifier positioned to direct the first light from the first angle to a second angle relative to the center, wherein the first light directed at the second angle is farther from the center than the first light emitted at the first angle;

a second light source on a second side of the image sensor, wherein the second light source emits second light at a third angle relative to the center; and a second modifier positioned to direct the second light from the third angle to a fourth angle relative to the center, wherein the second light directed at the fourth angle is farther from the center than the second light emitted at the third angle.

\* \* \* \* \*